United States Patent [19]

Powers, Jr.

[11] 4,445,880
[45] May 1, 1984

[54] SPEED CONTROL FOR MANUFACTURING PROCESS

[75] Inventor: Loren C. Powers, Jr., Manchester, N.H.

[73] Assignee: The International Paper Box Machine Co., Nashua, N.H.

[21] Appl. No.: 284,721

[22] Filed: Jul. 20, 1981

[51] Int. Cl.³ .............................................. B65G 47/26
[52] U.S. Cl. ...................................... 493/28; 198/460; 198/572
[58] Field of Search .................... 493/29, 28; 198/460, 198/572; 271/216, 203, 270, 199; 318/314, 318, 341

[56] References Cited

U.S. PATENT DOCUMENTS

| | | | |
|---|---|---|---|
| 2,266,054 | 12/1941 | Lowey et al. | 493/142 |
| 2,706,944 | 4/1955 | Claff et al. | 493/60 |
| 3,200,932 | 8/1965 | Metz et al. | 198/572 |
| 3,376,969 | 4/1968 | Baker et al. | 198/460 |
| 3,817,368 | 6/1974 | Wentz et al. | 198/572 |
| 3,842,719 | 10/1974 | Fernandez-Rana et al. | 271/216 |
| 4,002,270 | 1/1977 | Reiner | 222/58 |
| 4,012,996 | 3/1977 | Stolkin et al. | 493/162 |
| 4,135,346 | 1/1979 | Rebsamen | 53/494 |
| 4,150,324 | 4/1979 | Naito | 318/139 |
| 4,153,864 | 5/1979 | Minakuchi | 318/341 |
| 4,190,146 | 2/1980 | Kuchel | 198/460 |
| 4,289,999 | 9/1981 | Harshberger et al. | 318/341 |
| 4,318,540 | 3/1982 | Paananen et al. | 271/4 |
| 4,341,334 | 6/1980 | Bier | 271/270 |
| 4,355,712 | 10/1982 | Bruno | 198/460 |
| 4,360,098 | 11/1982 | Nordstrom | 198/572 |
| 4,361,318 | 11/1982 | Stobb | 271/199 |
| 4,369,876 | 1/1983 | Small et al. | 198/460 |

FOREIGN PATENT DOCUMENTS

| | | | |
|---|---|---|---|
| 2559322 | 9/1976 | Fed. Rep. of Germany | 493/28 |
| 34662 | 1/1965 | German Democratic Rep. | 271/216 |

Primary Examiner—Nicholas P. Godici
Assistant Examiner—Kurt Rowan
Attorney, Agent, or Firm—Pearson & Pearson

[57] ABSTRACT

A drive control circuit for assuring equal spacing of folded paper boxes in a stacker mechanism during manufacturing. Each box is folded in a gluer. As each box, in succession, transfers to the stacker mechanism a counter produces a variable width pulse. These pulses are converted into fixed width pulses with frequency proportional to the rate at which the folded paper boxes transfer to the stacker mechanism. The control circuit converts these fixed width pulses to constant energy pulses and integrates the constant energy pulses to provide a DC set point signal for a DC motor drive speed control circuit. During operation, the control assures that the stacker mechanism advances a substantially fixed, incremental distance each time a folded paper box is received from the gluer, thereby to ensure substantially even spatial distribution of the boxes along the stacker mechanism.

15 Claims, 5 Drawing Figures

SPEED CONTROL FOR MANUFACTURING PROCESS

BACKGROUND OF THE INVENTION

This invention generally relates to a speed control system for a manufacturing process and, more particularly, to a speed control system that is particularly well suited to the manufacture of paper boxes.

There are a number of manufacturing processes in which an article that is being processed is transported through and between a number of manufacturing machines. This invention is particularly well suited to processes in which articles are dispensed from a first machine at a variable rate and then are collected in a second machine that transports the articles with an even spatial distribution along a path.

One typical example of such a manufacturing process is found in the paper box manufacturing industry. Stated broadly, in a paper box manufacturing process blanks from a source pass through a machine known as a gluer. The gluer folds the box and applies glue at appropriate locations. The glued and folded box is then dispensed from the gluer into a stacker mechanism.

Typically, the stacker mechanism runs at a speed that allows the folded boxes from the gluer to be stacked in an overlapped relationship. When the boxes emerge from the stacker mechanism, they may merely be collected by an operator and packed in shipping boxes. Alternatively, the boxes may transfer to another machine.

In one particular stacker mechanism, the folded boxes from the gluer are caught between two, slowly moving, conveyer belts. Once caught, the boxes move through the stacker mechanism at a linear rate which is much less than the rate at which the boxes are collected thereby to produce the overlap. The belts in the stacker mechanism compress the boxes, and the compression is useful for a number of different reasons. For example, in some applications the compression of the boxes is used to hold the boxes tightly together in order to assist proper drying of the glue. In other applications, the compression is used, in conjunction with alignment elements, to maintain the boxes in a proper alignment as they pass through the stacker mechanism.

When the compression forces exerted by the stacker mechanism are to be maintained within any particular range, it is important that the boxes be collected along the path of travel through the stacker mechanism with even spacing. Thus, it is desirable to have the stacker mechanism vary the rate of travel through the stacker as a function of the rate at which folded boxes actually emerge from the gluer.

In prior systems, an operator visually monitors the relative spacing and adjusts the stacker mechanism speed to maintain the overlap at an approximately equal spacing. However, the inability to note the occurrence of a pile up and the inherent times required for a human being to react to uneven spacing and to convert that reaction into a physical movement of a control element is such as to introduce long averaging constants into the control loop. As a result, the spacing can still vary over quite a range.

The range is typified in the case of a jam, whereupon the gluer suddenly stops ejecting boxes into the stacker. At this point, the operator must sense that cessation and then stop the stacker mechanism. He must also then start the stacker at some arbitrary interval after the first paper box emerges from the gluer, and must then bring the stacker up to proper operating speed as quickly as possible. In terms of the rate at which boxes are ejected from the gluer and the variations in that rate, the time delays introduced by a human are so great as to make it very difficult to maintain an even spatial distribution of the boxes along the path of travel in the stacker mechanism.

SUMMARY OF THE INVENTION

Therefore, it is an object of this invention to provide a control system for a manufacturing process in which machine transport speed is dependent upon the rate at which articles to be transported enter the machine.

It is another object of this invention to provide a control system that allows an even spatial distribution of articles along a movable path over a wide range of input rates for the articles.

Still another object of this invention is to provide a control system for a paper box manufacturing process that enables boxes from a gluer to be transported through a stacker mechanism with an even spatial distribution.

Still yet another object of this invention is to provide a control system for a paper box manufacturing process that enables boxes to be stacked evenly in a stacker mechanism notwithstanding variations in the rate at which boxes enter the stacker mechanism.

In accordance with this invention, articles are supplied to a motor-driven mechanism for transport along a path of travel at a variable input rate. This input rate is sensed and converted into a set-point signal that is fed to a motor control system. The motor control system establishes the instantaneous velocity of a second path. More specifically, a constant, incremental energy is applied to a motor drive for the mechanism so the articles along the path move a fixed, incremental distance each time a new article is received in the mechanism.

This invention is pointed out with particularity in the appended claims. The above and further objects and advantages of this invention may be better understood by referring to the following detailed description taken in conjunction with the accompanying drawings.

DESCRIPTION OF AN ILLUSTRATIVE EMBODIMENT

Figure 1:
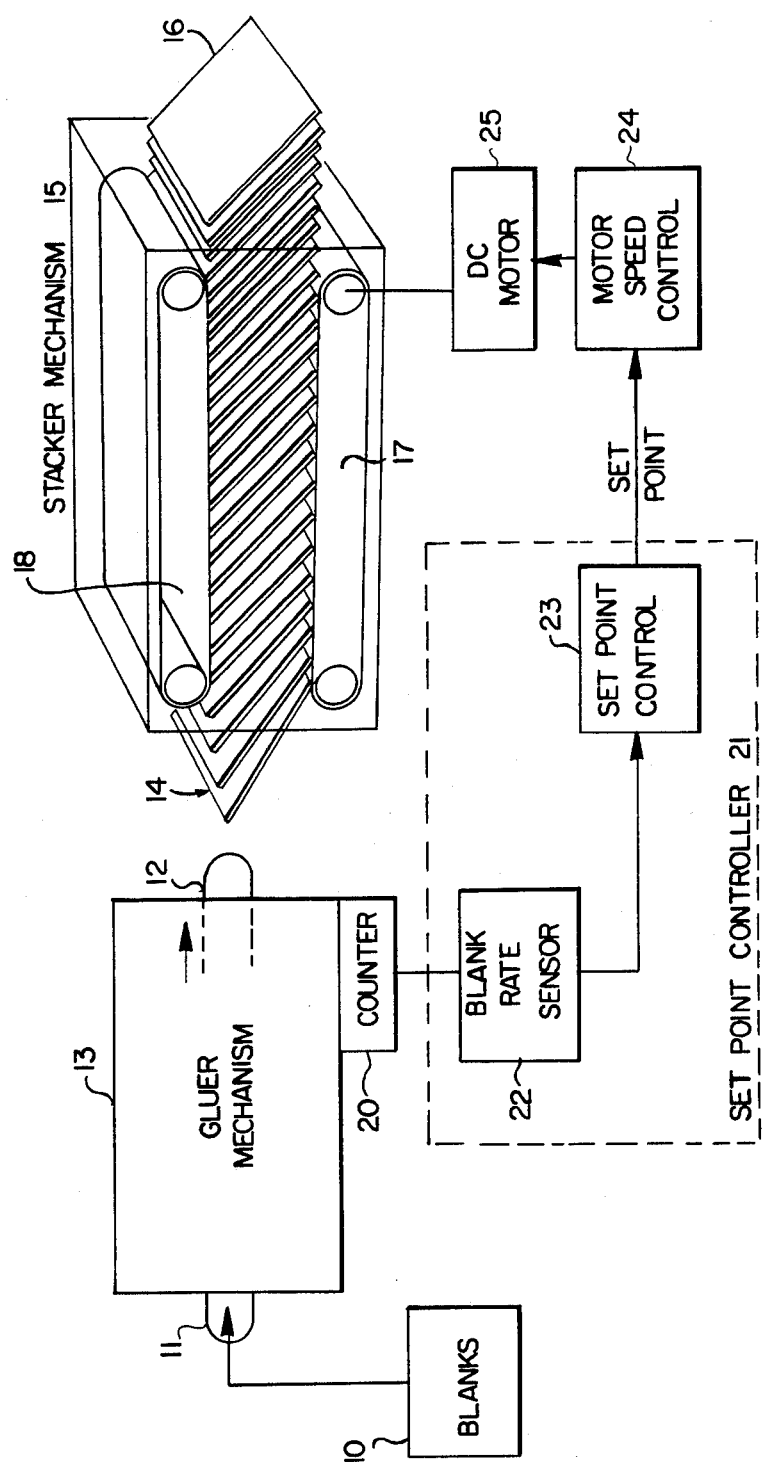
FIG. 1 is an illustration in schematic form of a manufacturing process for folding boxes that incorporates this invention.

As previously indicated, this invention is applicable to a number of manufacturing processes, but was developed in connection with a paper box manufacturing process that can generally be described with respect to FIG. 1. In this folding box manufacturing process, the box material, usually cardboard, is generally stamped and printed as a planar element. In this condition, the article is called a blank and provided from a source 10 of blanks. The blanks are fed to an input end 11 of a conveyer that carries the blanks to an output end 12 that also constitutes the output of a gluer mechanism 13. Although the gluer mechanism 13 is often a complex, mechanical apparatus, its basic function is to transport a blank from the input end 11 to the output end 12 while folding the blank along appropriate fold lines and applying glue at appropriate locations. What then emerges at the output end 12 of the conveyer is a flat, folded, glued box.

For purposes of this invention, it is necessary to understand that although the conveyer in the gluer mechanism 13 may run at a constant speed, the rate at which folded, glued boxes emerge from the gluer mechanism 13 may vary substantially. There are several causes for these variations. For example, the rate at which the blanks are fed from the source 10 to the input end 11 of the conveyer may vary. Even more drastic variations result when a jam occurs. Until the conveyer is stopped, the conveyer is running but no folded, glued boxes are dispensed from the gluer mechanism 13. Thus, the source 10 and the gluer mechanism 13 are exemplary of an article supply apparatus that dispenses articles at a variable rate.

As the flat, folded, and glued boxes are dispensed from the gluer mechanism 13, they are received at an input 14 of a stacker mechanism 15. Various elements may be used between or in the vicinity of the output end 12 of the conveyer and the input 14 to guide the flat boxes into a proper position but, normally, the boxes leave the gluer mechanism 13 with sufficient velocity so that their momentum carries them to the stacker mechanism 15, where they jam against previously received boxes in an overlapped relationship, as shown by the boxes 16.

A typical stacker mechanism 15 contains two, spaced conveyer belts 17 and 18 that are motor driven and move the stacked boxes 16 along a path which, in FIG. 1, is in the plane of the paper from left to right. The conveyers 17 and 18 can be spring-loaded to apply a compression force on the boxes. However, this compression force desirably is maintained at a constant level on each box as it passes through the stacker mechanism 15. With conventional stacker mechanisms, this even force is facilitated by assuming an even spatial distribution of the boxes along the belt and, hence, an even overlap of adjacent boxes. As previously indicated, maintaining even compression may be important either for assuring proper gluing operations or for assuring proper alignment of boxes for subsequent operations.

Still referring to FIG. 1, this desirable, even spatial distribution is achieved over a wide range of input rates by a control circuit that is constructed in accordance with this invention. The control circuit includes a counter 20 that is of conventional form and that mounts on the gluer mechanism 13. It produces a variable frequency signal. Specifically, the counter 20 produces a signal each time one of the boxes 16 passes the counter 20 by interrupting a light beam. The duration of the pulse will be dependent upon the velocity of the box past the counter 20 and the length of the box in the direction of travel.

The signal from the counter 20 is applied to a set point controller 21 that includes a blank rate sensor 22 and a set point control 23. The blank rate sensor 22 produces a constant width pulse each time a box passes the counter 20. Over a long period of time the frequency of the signal from the blank rate sensor 22 will vary as a function of the rate at which the boxes 16 pass the counter 20. This blank rate sensor circuit 22 is described later with respect to FIG. 4.

The set point control 23 converts the constant width, variable frequency signals from the sensor 22 into a variable, DC set point signal. It uses an integrating circuit with a very short time constant to obtain nearly a pulse-by-pulse integration. Thus, only minimal averaging occurs in the set point control 23, and the set point signal closely reflects the instantaneous rate at which the boxes 16 are received by the stacker mechanism 15.

The set point signal is applied to a conventional, motor speed control 24 that includes SCR or other circuitry for controlling a DC motor 25 that drives the conveyors 17 and 18 in the stacker mechanism 15. The instantaneous rate signal enables the motor speed control 24 and DC motor 25 to move the conveyers 17 and 18 a fixed, incremental distance each time an article passes. This maintains an essentially even spatial distribution of the boxes 16 along the length of the conveyers 17 and 18.

Figure 2:
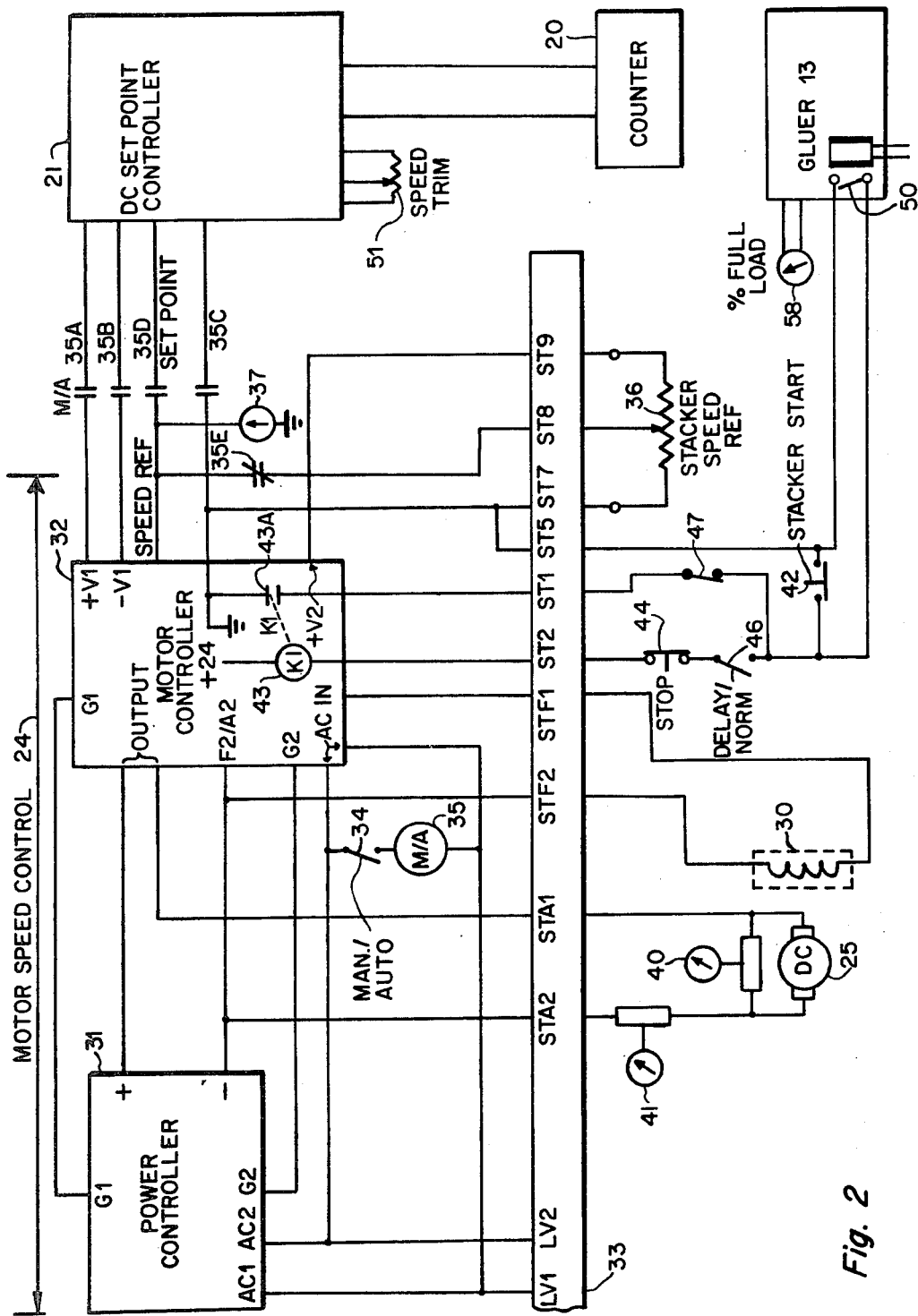
FIG. 2 is a functional, block diagram of the control elements shown in FIG. 1.

In FIG. 2 and the remaining figures, like reference numerals refer to like elements, even though the elements may be depicted in different forms. For example, the DC motor 25 is depicted in block form in FIG. 1 and in schematic form in FIG. 2. The basic flow of information shown in FIG. 1 occurs in the circuit shown in FIG. 2; that is, signals from the counter 20 associated with the gluer mechanism 13 are conveyed to a DC set point controller 21. The controller 21 produces a set point signal that energizes a SPEED REF input to a motor speed control 24 for the DC motor 25.

FIG. 2 also depicts a specific physical embodiment of the set point controller 21 and motor speed controller 24, including control switches, rheostats, and display devices. One embodiment of a control panel for supporting these control and indicating devices and also for housing the circuitry is shown in FIG. 2.

Now referring to FIG. 2, the motor speed control 24 comprises a power controller circuit 31 and a motor controller circuit 32. AC signals at terminals LV1 and LV2 of a terminal connection strip 33 energize both the power controller circuit 31 and the motor controller circuit 32.

The control shown in FIG. 2 can be operated automatically in accordance with this invention, or in a manual override mode. The selection of this mode is controlled by a switch 34, shown in FIGS. 2 and 3, that is depicted in the MANUAL position in FIG. 2. When the switch 34 closes to the AUTO position, a relay 35 is energized, closing normally open contacts 35A through 35D, thereby to interconnect the set point controller 21 and the motor controller circuit 32 while opening normally closed contact 35E and, thereby, isolating the circuit 32 from a manual stacker speed rheostat 36, also shown in FIG. 3. During the manual mode, an internally developed voltage +V2 in the motor control 32 energizes the stacker speed rheostat 36 through terminals ST9 and a ground terminal ST7. The sliding contact of the rheostat connects to the ST8 terminal and through the normally closed contacts 35E to the SPEED REF input of the motor control 32.

In either manual or automatic operation, a voltmeter 37 monitors the set point signal to display its value. Also, in either mode the motor control 32 produces two basic signals in response to gating signals applied to power controller circuit 31 that contains silicon controlled rectifier circuitry. Both the power controller circuit 31 and the motor controller circuit 32 interact to control armature current that is applied through the terminals STA1 and STA2 to the armature circuit of the motor 25. Connections are also made from the motor controller circuit 32 through terminals STF1 and STF2 to a field coil 30. If the motor is a permanent magnet motor, no such field connections are made. Two sensing circuits are applied to the DC motor circuit. They include an armature voltage meter 40 and an armature current meter 41, both of which are shown in FIG. 3.

Figure 3:
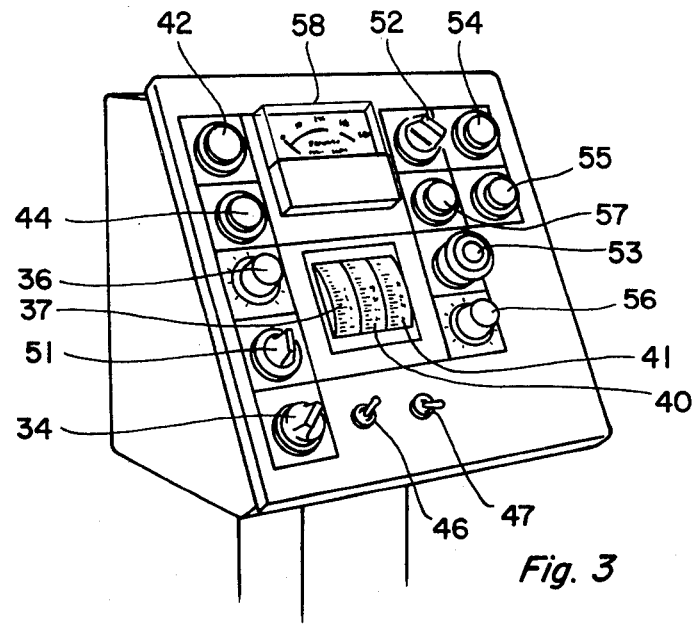
FIG. 3 is a pictorial view of a control panel and housing for the circuitry shown in FIGS. 1 and 2.

A stacker start switch 42, shown in FIGS. 2 and 3 provides one mechanism for starting the stacker. More specifically, when the motor controller circuit 32 is energized by an a.c. voltage and the stacker start switch 42 is momentarily engaged, a relay 43 is energized through normally closed stop switch 44 and delay switch 46. In response thereto, the contacts 43A of relay 43 close, and so long as the switch 47 remains closed, the circuit 32 remains operative. Thus, the contacts 43A constitute a holding circuit for the relay 43.

When the stop switch 44 is opened, the current is interrupted and the stacker stops. The delay-norm switch 46, when open, delays the start of the stacker until that switch is closed even though the gluer mechanism 13 has started. When the NORM/CONT switch 47 closes, the stacker operates continuously even though the gluer mechanism 13 stops. Relay contacts 50 span the switch 42. They allow the stacker to start automatically with the gluer 13, and independently of the stacker start switch 42.

Other controls shown in FIGS. 2 and 3 include a speed trim control 51 that allows the stacker speed to be offset, thereby to fine tune spatial distribution. A gluer start switch 52 and a gluer stop switch 53 are two controls that allow an operator to control the gluer from the control panel shown in FIG. 3. A feed-start switch 54 and a feed-stop switch 55 control the delivery of blanks from the source 10 in FIG. 1 to the gluer 13. A rheostat 56 controls gluer speed and a jog control 57 allows momentary energization of the gluer, thereby to advance the gluer incrementally. Another meter 58, also shown on FIG. 2, connects to the gluer 13 to produce a signal indicating the load on the gluer 13. This indicates the loading of the gluer as a percentage of its desired maximum rate.

When the switch 34 in FIG. 2 is closed, the relay 35 energizes and closes contacts 35A through 35D and opens contacts 35E. The contacts 35A, 35B, and 35C provide paths for positive and negative voltages and a common, or ground, connection to the set point controller 21. Contacts 35 provide a path for a set point signal from the set point controller 21 to the SPEED REF input of the motor controller 32.

Assuming that the gluer mechanism 13 is on and the switch 46 is closed, operation of the gluer energizes the motor controller 32 and, as articles pass from the gluer mechanism 13 to the stacker mechanism 15 in FIG. 1, the SET POINT signal will increase. The motor 25 will come up to speed and the stacker mechanism will advance the boxes at a rate that depends upon the rate at which the boxes are received. If the flow of boxes is interrupted, the counter 20 produces no signal and the SET POINT signal goes to an essentially zero value, thereby stopping the motor 25.

Figure 4:
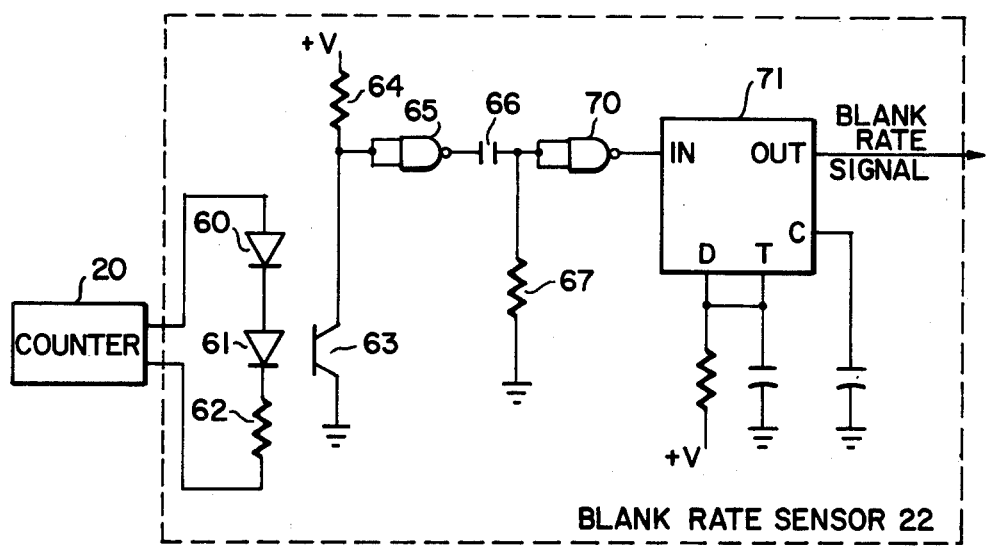
FIG. 4 is a detailed schematic of a blank rate sensor that is shown in FIG. 1.

The counter 20, the motor speed control 24, and the DC motor 25 are conventional elements. The blank rate sensor 22 is shown in FIG. 4. In this particular embodiment, the counter 20 energizes a load circuit while a box is passing the counter 20. The load circuit comprises an L.E.D. 60, a light-emitting diode 61, and a resistor 62. The light-emitting diode is physically juxtaposed a photo-sensitive transistor 63, thereby to isolate the electrical ground of the blank rate sensor and set point controller from the machine. When the transistor 63 conducts, the signal at its collector junction with a resistor 64 from the positive power supply shifts to a ground value. An inverter 65 then energizes a differentiation circuit comprising a capacitor 66 and a resistor 67, thereby to produce a negative-going pulse at the output of another inverter 70 at the leading edge of each pulse from the counter 20.

Each negative-going pulse triggers a monostable multivibrator 71 connected in a nonretriggerable mode, thereby to produce a fixed-width, positive-going pulse at the output. This pulse constitutes a BLANK RATE signal and has a fixed width, or time duration. The pulse width is less than the interval between successive pulses from the counter 20. The frequency of the pulses over a long time period varies as a function of the rate at which the boxes pass the counter 20.

Figure 5:
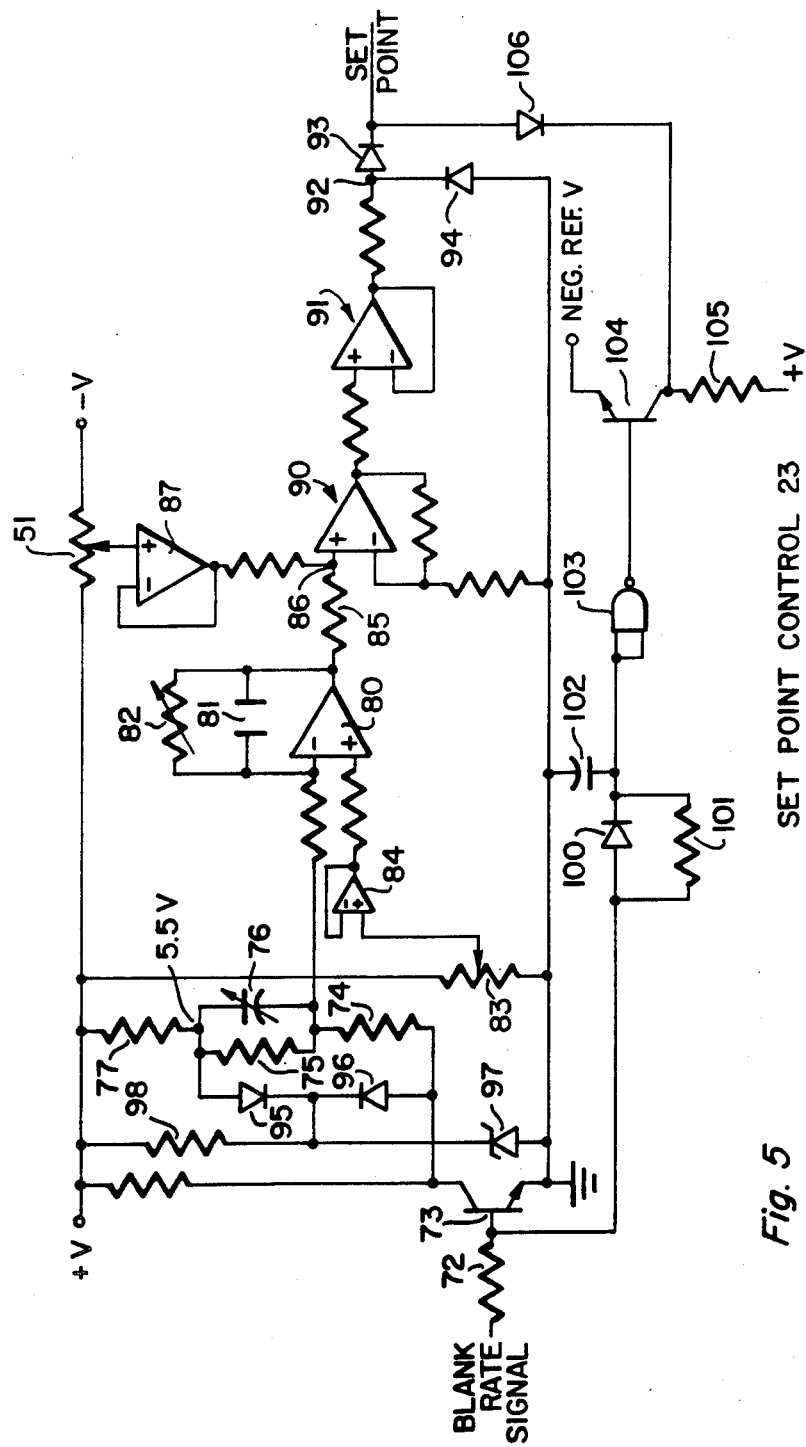
FIG. 5 is a detailed, schematic diagram of a set point control that is shown in FIG. 1.

As shown in FIG. 5, the BLANK RATE signal passes from the sensor 22 to the set point control 23 through a coupling resistor 72. An inverting transistor 73 then produces a negative-going, fixed width pulse that is applied to one end of a load circuit comprising a resistor 74 that is in series with a parallel circuit comprising a resistor 75 and variable capacitor 76. The other end of the load circuit connects through a resistor 77 to the positive power supply voltage +V from the relay contact 35A. The signal at the junction of the resistors 74 and 75 is resistively coupled to the negative input of an operational amplifier 80. A negative feedback loop for the amplifier comprises an integrating capacitor 81 and a variable gain adjusting resistor 82. The positive input terminal of the operational amplifier 80 receives a signal from a potentiometer 83 through a unity gain operational amplifier circuit 84.

The output signal from the operational amplifier 80 swings between a positive and a negative maximum, depending upon the frequency of the blank rate signal and the setting of the gain resistor 82. At low rates of transfer, the output signal of the operational amplifier is at a negative level, while at high rates the output of the output signal swings to a positive level.

A resistor 85 couples this signal to a summing junction 86. The other input to the summing junction is the output from a unity gain operational amplifier 87 that also connects to the center tap of the speed trim rheostat 51. This resistor 51, also shown in FIG. 2, connects to the positive and negative voltage supply through contacts 35A and 35B. The summed signal at the junction 86 then energizes an operation amplifier 90 and a unity gain amplifier 91 to produce an output signal at a junction 92 that is coupled through a diode 93 to become the SET POINT signal that is applied to the motor speed control 24 in FIG. 1.

A diode 94 between ground and the junction 92 is poled to prevent negative-going excursions of the junction 92.

Diodes 95 and 96, together with a zener diode 97 and a resistor 98, establish a reference signal at the common cathode junction of the diodes 95 and 96 and also, through the diode 95, at the junction of the resistor 77 and the resistor 75. The diode 96 limits the positive voltage on the collector of transistor 73 to a maximum value. Thus, the input pulses to the load circuit have constant width and constant voltage magnitude and are constant energy pulses. The speed control circuit 24 in FIG. 1 thus responds to each constant energy pulse by causing the motor 25 to advance a fixed incremental distance during each pulse.

Another circuit monitors the blank rate signal and shifts the SET POINT signal from the diode 93 to an essentially zero value when the blank rate signal drops below a predetermined level. This circuit includes an integrator including a diode 100, a resistor 101, and a capacitor 102. During normal operation, the capacitor 102 is charged and an inverter 103 maintains a transistor 104 in a nonconducting state. The voltage from a resistor 105 in the collector circuit for the transistor 104 back-biases a diode 106, and the SET POINT signal is allowed to be at its normal level. However, when boxes stop passing the counter, the frequency of the BLANK RATE signal 72 drops, and the energy stored in and the voltage across the capacitor 102 decrease. At some point, the inverter 103 shifts state to a positive level. The transistor 104 then conducts, and shorts the cathode of the diode 106, to a small Neg. Ref. Voltage to counter balance the positive voltage drop across diode 106, and thereby clamps the SET POINT signal to ground.

Now referring to FIGS. 4 and 5 together, it will be apparent that variable frequency pulses from the blank rate sensor 22 are converted into constant energy pulses in the set point control 23. These pulses are integrated, and the integral is summed with the speed trim signal that can be shifted between a positive and a negative value, thereby to produce a DC set point signal. As a result, the motor speed control 24 in FIG. 1 modifies the operation of the DC motor 25 and causes the conveyers 17 and 18 to advance at a rate that is determined by the rate at which the articles are received. In operation, the components are selected so the set point reflects nearly an instantaneous indication of the blank rate signal and the speed of the conveyers closely reflects the rate at which the blanks are received. The operation can also be considered from the standpoint that, with a constant energy being applied to the control circuit each time a blank passes, the control circuit causes the motor to advance a fixed incremental distance for each blank that corresponds to the spatial distribution. Using either theory, the control circuit enables the boxes to be evenly spaced along the length of the stacker mechanism 15 thereby to accomplish the basic object of this invention.

In summary, there is disclosed a control circuit for allowing the even spatial distribution of articles along a moving path. The circuit operates independently of the rate at which the articles are received at the entrance to the path. This invention has been described with respect to a specific manufacturing process for folded paper boxes and has been described in terms of a specific embodiment utilizing particular components. However, it will be apparent to those of ordinary skill in the art that this invention is applicable to other manufacturing processes and that other specific circuit embodiments could be utilized as substitutes for portions of the specifically described circuits. However, these variations would still result in a control that retained some or all of the objects and advantages of the specifically described circuit. Therefore, it is the object of the appended claims to cover all such variations and modifications as come within the true spirit and scope of this invention.

What is claimed as new and desired to be secured by Letters Patent of the United States is:

1. In a manufacturing system having transport means for conveying articles along a path, drive means for moving the transport means, and supply means for supplying the articles to the transport means, the articles being supplied by the supply means at a rate of travel which is independent of the rate of travel of the articles conveyed by the transport means, the improvement of drive control means for causing the articles to be evenly spaced on the transport means along a path, said drive control means comprising:
   A. sensing means for indicating the passage of each article from the supply means to the transport means;
   B. set point controller means connected to said sensing means for converting the indications from said sensing means into a variable DC set point signal, the level of said variable DC set point signal being governed by the rate at which the articles pass from the supply means to the transport means; and
   C. speed control means connected to said set point controller means and the drive means for controlling the drive means as a function of the passage of each article from the supply means to the transport means, the drive means controlling the transport means and rate of travel of the articles conveyed by the transport means in response to the set point signal, the rate of travel of the articles on the transport means varying according to the level of the variable DC set point signal for maintaining an even spacing between the articles conveyed along a path by the transport means.

2. A drive control means as recited in claim 1 wherein said control signal means includes:
   i. rate sensor means connected to said sensing means for producing a rate signal in response to the indications from said sensing means; and
   ii. set point control means connected to said rate sensor means and said speed control means for converting the rate signal into a set point signal that establishes an operating condition for said speed control means and the drive means.

3. A drive control means as recited in claim 2 wherein said sensing means comprises counter means for producing a variable width electrical pulse each time an article passes from the supply means to the transport means and wherein said rate sensor means includes:
   a. variable width pulse generating means for generating variable width pulses corresponding to the variable width pulses from said sensing means, said variable width pulse generating means being electrically isolated from said counter means; and
   b. means connected to said variable width pulse generating means for producing fixed width pulses from the variable width pulses, the frequency of the pulses being a function of the rate at which the articles pass from the supply means to the transport means.

4. A drive control means as recited in claim 3 wherein said set point control means includes:
   a. means connected to said rate sensor means for converting the fixed width pulses therefrom to constant energy pulses;
   b. integrating means connected to said conversion means for producing a DC signal that is the integral of the constant energy pulses; and c. amplifier means connected to said integrating means for generating said variable DC set point signal in response to the DC signal.

5. A drive control means as recited in claim 4 wherein said set point control means additionally includes offset voltage means for generating an offset voltage, and said amplifier means includes an input junction means for summing the outputs from said offset voltage means and said integrating means thereby to provide a means for operator compensation of the overall speed of the transport means.

6. A drive control means as recited in claim 4 wherein said set point control means additionally includes voltage limiting means connected to the output of said amplifier means for limiting the set point signal.

7. A drive control means as recited in claim 4 wherein said set point control means includes integrating means connected to receive the rate signal from said rate sensor means and voltage clamping means connected to said integrating means for clamping the set point signal to a predetermined value when the frequency of the rate signal drops below a predetermined level.

8. In a system for manufacturing folded paper boxes, the system including a source of blanks, gluer means for folding and gluing the blanks thereby forming the folded paper boxes, stacker means for accumulating and transporting the folded paper boxes from the gluer means along a path in an overlapped configuration, the rate of travel of the folded boxes from the gluer means being independent of the rate of travel of the folded paper boxes transported by the stacker means, and motor means for driving the stacker means, the improvement of a motor control means for energizing the motor means and advancing the stacker means so that the overlapped boxes are evenly spaced in the stacker means along the path, said motor control means comprising:
  A. sensing means mounted on said gluer means for indicating the passage of each box from the gluer means to the stacker means;
  B. control signal means connected to said sensing means for converting the indication therefrom to a variable DC set point signal, the level of said variable DC set point signal being governed by the rate at which the articles pass from the gluer means to the stacker means; and
  C. speed control means connected to said control signal means and the motor means for controlling the motor means in response to the transfer of each box from the gluer means to the stacker means, the rate of travel of the boxes transported by the stacker means is controlled by the motor means as a function of the level of said variable DC set point signal, said rate of travel being such that an even spacing is maintained between the boxes transported by the stacker means.

9. A motor control means as recited in claim 8 wherein said control signal means includes:
  i. rate sensor means connected to said sensing means for producing a rate signal in response to the indications from said sensing means; and
  ii. set point control means connected to said rate sensor means and said speed control means for converting the rate signal into a set point signal that establishes an operating condition for said speed control means and the drive means.

10. A motor control means as recited in claim 9 wherein said sensing means comprises counter means for producing a variable width electrical pulse each time a box passes from the gluer means to the stacker means and wherein said rate sensor means includes:
  a. variable width pulse generating means for generating variable width pulses corresponding to the variable width pulses from said sensing means, said variable width pulse generating means being electrically isolated from said counter means; and
  b. means connected to said variable width generating means for producing fixed width pulses from the variable width pulses, the frequency of the pulses being a function of the rate at which the boxes pass from the gluer means to the stacker means.

11. A motor control means as recited in claim 10 wherein said set point control means includes:
  a. means connected to said rate sensor for converting the fixed width pulses therefrom to constant energy pulses;
  b. integrating means connected to said conversion means for producing a DC signal that is the integral of the constant energy pulses; and
  c. amplifier means connected to said integrating means for generating the set point signal in response to the integrated signal from said integrating means.

12. A motor control means as recited in claim 11 wherein said set point control means additionally includes offset voltage means for generating an offset voltage and said amplifier means includes an input junction means for summing the outputs from said offset voltage means and said integrating means thereby to provide a means for operator compensation of the overall speed of the stacker means.

13. A motor control means as recited in claim 11 wherein said set point control means additionally includes voltage limiting means connected to the output of said amplifier means for limiting the set point signal.

14. A motor control means as recited in claim 11 wherein said set point control means includes integrating means connected to receive the rate signal from said rate sensor means and voltage clamping means connected to said integrating means for clamping the set point signal to a predetermined value when the frequency of the rate signal drops below a predetermined level.

15. A motor control means as recited in claim 9 additionally comprising:
  a. manually operable means for generating a set point signal, and
  b. switching means connected to said set point control means and said manual means for selectively coupling one of the set point signals to said speed control means, thereby to enable manual override of said motor control means.

* * * * *